United States Patent
Garcia

(10) Patent No.: US 9,908,665 B2
(45) Date of Patent: Mar. 6, 2018

(54) REUSABLE BOTTLE CAP HAVING IDENTIFICATION MEANS

(71) Applicant: Daniel L. Garcia, San Diego, CA (US)

(72) Inventor: Daniel L. Garcia, San Diego, CA (US)

( * ) Notice: Subject to any disclaimer, the term of this patent is extended or adjusted under 35 U.S.C. 154(b) by 141 days.

(21) Appl. No.: 15/061,898

(22) Filed: Mar. 4, 2016

(65) Prior Publication Data
US 2016/0185489 A1 Jun. 30, 2016

Related U.S. Application Data

(60) Continuation-in-part of application No. 14/560,233, filed on Dec. 4, 2014, now Pat. No. 9,327,876, which is a continuation of application No. 14/321,726, filed on Jul. 1, 2014, now abandoned, which is a division of application No. 12/852,261, filed on Aug. 6, 2010, now Pat. No. 8,763,831.

(60) Provisional application No. 61/289,927, filed on Dec. 23, 2009.

(51) Int. Cl.
| | |
|---|---|
| *B65D 51/24* | (2006.01) |
| *B65D 39/00* | (2006.01) |
| *B65D 39/04* | (2006.01) |
| *B65D 47/08* | (2006.01) |
| *B65D 47/12* | (2006.01) |

(52) U.S. Cl.
CPC ......... *B65D 39/0023* (2013.01); *B65D 39/04* (2013.01); *B65D 47/0842* (2013.01); *B65D 47/12* (2013.01); *B65D 51/245* (2013.01); *B65D 2539/003* (2013.01); *Y02W 30/807* (2015.05)

(58) Field of Classification Search
CPC .............. B65D 39/0023; B65D 51/245; B65D 47/0842; B65D 47/12; B65D 39/04; B65D 2539/003; Y02W 30/807
USPC ......... 215/355, 364, 320; 220/521, 523, 801
See application file for complete search history.

(56) References Cited

U.S. PATENT DOCUMENTS

| | | |
|---|---|---|
| 650,615 A | 5/1900 | Salomon |
| 1,832,806 A | 11/1931 | Dawson |
| 2,663,451 A | 12/1953 | Yamall |
| 2,872,060 A | 2/1959 | Herbert et al. |
| 2,976,629 A | 3/1961 | Brixius et al. |
| 3,163,544 A | 12/1964 | Valyi |
| 3,239,090 A | 3/1966 | Bramming |
| 3,578,027 A * | 5/1971 | Zopfi ................. F16L 55/1141 138/89 |
| 3,659,738 A | 5/1972 | Friedmann et al. |
| 3,716,163 A | 2/1973 | Marcel |
| 3,821,969 A | 7/1974 | Sinko |
| 4,194,640 A | 3/1980 | Crankshaw et al. |
| 4,279,353 A | 7/1981 | Honma |

(Continued)

*Primary Examiner* — James N Smalley
(74) *Attorney, Agent, or Firm* — Charles F. Reidelbach, Jr.

(57) ABSTRACT

A reusable bottle cap system includes a bottle cap and a bottle cap cover. The bottle cap includes a proximal handling portion and a stem that extends from the proximal handling portion to a distal end. The stem has opposing outside and inside surfaces. The outside surface includes a sealing feature for sealing to the mouth of a beverage bottle. The inside surface defines an opening extending to the distal end of the stem. The shell has an inside surface defining a cavity that is closed at a distal end. A pin extends from the distal end of the inside surface of the shell. The pin is received into the opening of the stem to provide a holding force to secure the bottle cap cover to the bottle cap.

14 Claims, 16 Drawing Sheets

(56) References Cited

U.S. PATENT DOCUMENTS

| | | | |
|---|---|---|---|
| 4,380,304 A | | 4/1983 | Anderson |
| 4,475,654 A | | 10/1984 | Fruchter |
| 4,640,434 A | | 2/1987 | Johnsen et al. |
| 4,776,972 A | | 10/1988 | Barrett |
| 4,866,952 A | | 9/1989 | Hight et al. |
| 5,165,003 A | | 11/1992 | Carter |
| 5,180,073 A | | 1/1993 | Fay et al. |
| 5,353,965 A | | 10/1994 | Lee |
| 5,456,379 A | * | 10/1995 | Krupa ................ B65D 43/162 206/508 |
| 5,637,107 A | | 6/1997 | Vaillancourt |
| 5,766,936 A | * | 6/1998 | Kayal ................... C12M 23/08 215/354 |
| 5,769,263 A | | 6/1998 | Willingham et al. |
| 5,833,089 A | | 11/1998 | Manni et al. |
| 6,745,505 B2 | | 6/2004 | Moran |
| 7,261,216 B2 | | 8/2007 | Becker et al. |
| 7,490,629 B2 | | 2/2009 | Williams et al. |
| 2003/0127416 A1 | | 7/2003 | Salazar-Leal |
| 2004/0068900 A1 | | 4/2004 | Moran |
| 2005/0235532 A1 | | 10/2005 | Eberl et al. |
| 2009/0014348 A1 | * | 1/2009 | Strange ................... B65D 1/36 206/508 |
| 2009/0026104 A1 | | 1/2009 | Cassidy |
| 2011/0084045 A1 | | 4/2011 | Self |
| 2011/0108511 A1 | * | 5/2011 | McKinney ......... B65D 39/0017 215/355 |
| 2015/0166223 A1 | * | 6/2015 | Yamamoto ......... B65D 39/0011 215/364 |

\* cited by examiner

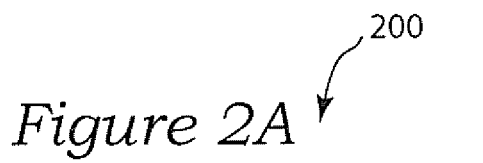
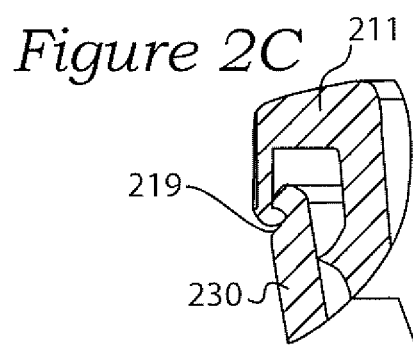
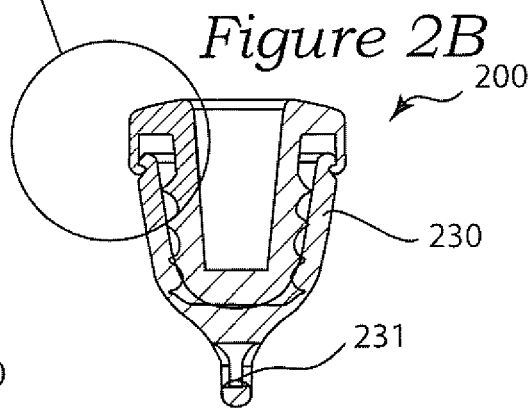
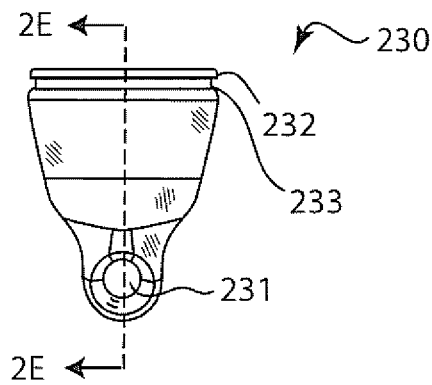

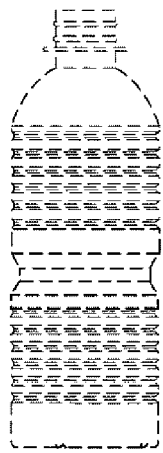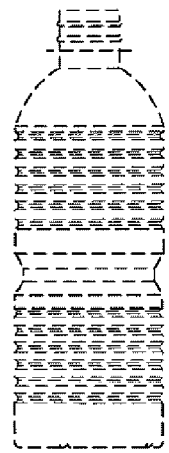
Figure 6A　　　　Figure 6B
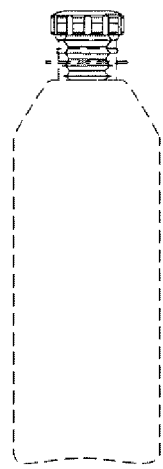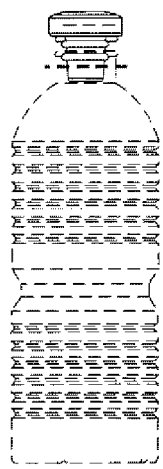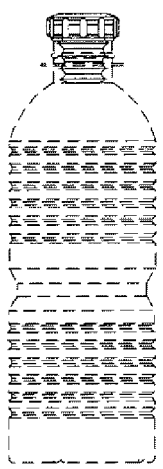
Figure 6C　　Figure 6D　　Figure 6E

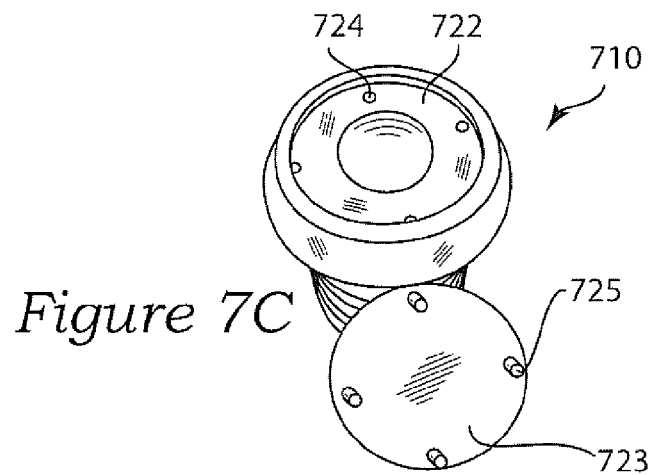
Figure 7C
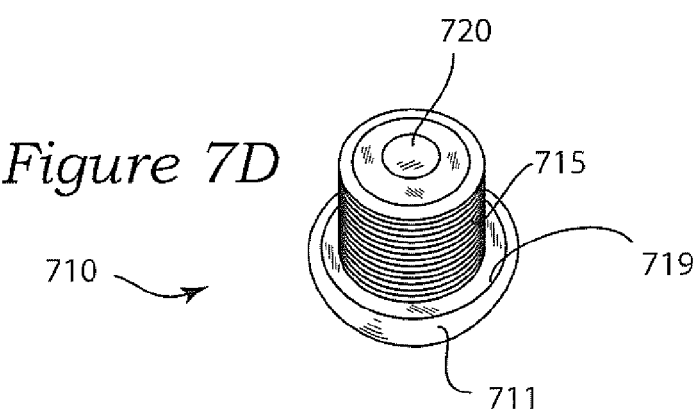
Figure 7D
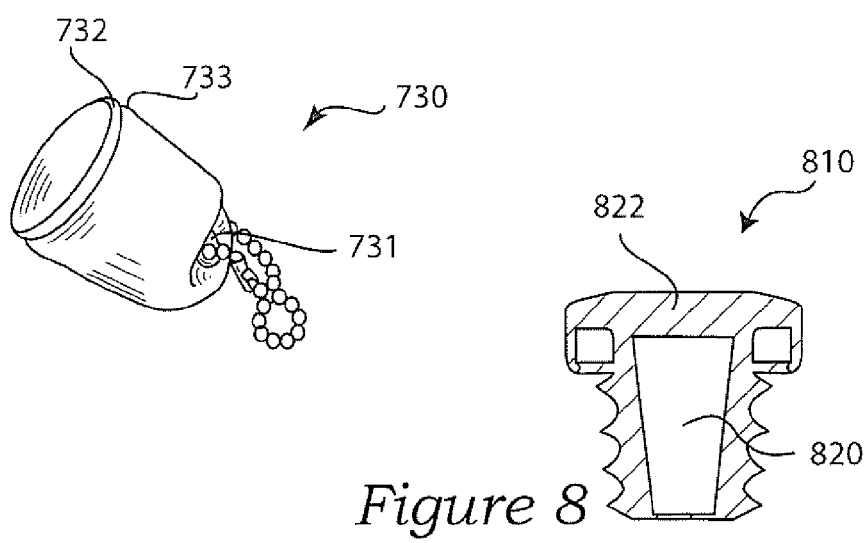
Figure 7E
Figure 8

REUSABLE BOTTLE CAP HAVING IDENTIFICATION MEANS

PRIORITY OF THE INVENTION

This utility patent application is a continuation in part of U.S. application Ser. No. 14/560,233, filed on Dec. 4, 2014, which is a continuation of U.S. application Ser. No. 14/321,726 filed on Jul. 1, 2014, which is a divisional of U.S. application Ser. No. 12/852,261 filed on Aug. 6, 2010, now U.S. Pat. No. 8,763,831, which claims the benefit of provisional application No. 61/289,927, filed on Dec. 23, 2009, and which are incorporated herein by reference.

BACKGROUND

1. Field of the Invention

The present invention pertains generally to methods of environmental preservation and saving of natural resources (specifically water), in addition to preserving manufactured and raw materials. More particularly, the invention relates to a reusable bottle cap device providing identification of a bottle to a user, minimizing or eliminating waste associated with any unused portions of the contents therein and encouraging reuse of disposable drinking bottles, especially water bottles.

2. Description of the Prior Art

Many reusable bottle caps have been introduced heretofore also employing identification means. One early example was proposed by Brixious and was granted U.S. patent protection in 1961, entitled "Identifying Device," U.S. Pat. No. 2,976,629.

According to Brixious, in bowling alleys, particularly during team play in league competition, spectators and players alike are present in large numbers. On such occasions, as well as similar gatherings, beverages such as soft drinks, beer and the like are purchased by both spectators and players who are constantly moving about, and during consumption thereof often set their drinks down at the most convenient location with the intention of returning thereto. Due to the large number of drinks that may be temporarily deposited in a relatively restricted area, and the fact that the players and spectators move about during the period of play, confusion as to the ownership of the various drinks often arises.

In more recent times, the dominant beverage consuming activity has become drinking water from bottles comprised of polyethylene or polyurethane plastic in such gatherings such as: company picnics, sporting events, hiking, camping, boating, industry and political conventions, trade shows, academic conferences, construction sites, professional groups, and a myriad of networking and social gatherings. The total bottled water consumption has grown vastly in our most recent history.

Accordingly, it is an object of the present invention to minimize the waste associated with beverage (especially water) drinkers losing track of a beverage (especially water) bottle after the contents have been only partially or marginally consumed. Also, the practice of washing, rinsing, and reusing beverage (especially water) bottles is increasing in practice. Hence, it is an additional object of the present invention to promote this practice and therefore reduce non-biodegradable landfill waste and raw material consumption.

Not surprisingly, more recent efforts to gain patent protection on beverage identification means have emerged. Two such examples are U.S. Pat. No. 6,745,505 entitled "Color Coded Beverage Cap Collection with Permanent Passive Indicia Indicating Beverage Bottle User Identities," to Moran: and U.S. Pub. Pat. App. No. 2009/0026104, entitled "Bottle-Cap Identification System." disclosed by Cassidy. It is an objective of the present invention to provide a novel alternative design to those that have been proposed in the prior art that can be can be configured to different beverage (especially water) bottles having varied thread configurations and varied diameter openings at the top, through which the contents are delivered. It is further an object of the present invention to provide a design that may be inexpensively cast to a mold and mass produced and therefore comparatively cost effective. It is still further an object of the present invention to provide a bottle cap cover to protect the bottle cap from dirt and debris while not in use, thereby maintaining hygiene and thus maximizing the usable life of the present invention. It still further noted that the present invention will be sufficiently sturdy to withstand repeated washings, thereby encouraging multiple uses.

BRIEF SUMMARY OF THE INVENTION

The present invention specifically addresses and alleviates the above mentioned deficiencies associated with the prior art. More particularly, the present invention, in a first aspect comprises reusable bottle cap system (bottle plus cover) comprising: a bottle cap portion comprising: a stem portion about a vertical axis; and a flanged ring portion about an upper end of the stem portion, wherein the stem portion further comprises a plurality of successive U-shaped grooves along a length thereof, the U-shaped grooves forming a crest and a trough, the crest between two adjacent troughs forming a point.

The reusable bottle cap system is further characterized wherein the plurality of successive U-shaped grooves are aligned perpendicular to the vertical axis. The invention in this aspect is additionally characterized in that the flanged ring portion comprises an outside surface that extends outwardly and downward smoothly and continuously to form a rounded ring from a lateral side to a top surface. Still further the invention is characterized wherein the lateral side comprises a lip that extends inward toward the stem portion. The stem also comprises a slight taper.

Furthermore, the reusable bottle cap system of this invention aspect is characterized wherein the stem is hollow throughout its length from a top end to a bottom end, further except wherein a hollow stem is closed at the bottom end. Also, stem may be hollow throughout its length from a top end to a bottom end; or alternatively hollow except that it is closed at either a top end or a bottom end.

The reusable bottle cap system herein is further is further characterized as comprising a bottle cap cover to house and enclose the stem portion, the bottle cap cover further comprising: a crown at a top end thereof; a mid-portion comprising a surface having a convex shape; and a mouth having a lip wherein the lip comprises a groove, the groove configured to mate with complementary structure of the bottle cap, wherein the bottle cap cover is designed to keep the bottle cap free from dirt and debris when not in use.

The cover to the bottle cap is also characterized as comprising an eyelet protruding from the crown, the eyelet designed to link to a key chain of a user. Alternatively, the eyelet protrudes from the mid-portion of the cover.

In a second aspect, the invention is characterized as a reusable bottle cap comprising: a stem portion about a vertical axis; and a flanged ring portion about an upper end of the stem portion, wherein the stem portion further comprises a two semi-circular grooves along a length thereof, the semi-circular grooves configured to receive two O-rings. The invention in this aspect is characterized wherein the flanged ring portion comprises a plurality of lengthwise ridges, the ridges designed to improve grasping of the bottle cap.

The invention is additionally characterized in that the flanged ring portion further comprises a top portion, the top portion having a circular recess configured to receive a marker of the present invention. The flanged ring portion also has a lateral side, the lateral side having a lip protruding inward toward the stem portion, the lip configured to mate with complementary structure on a bottle cap cover. The invention is also characterized wherein the stem is hollow throughout its length from a top end to a bottom end, wherein a hollow portion in the stem is further tapered from a top end to a bottom end. The reusable bottle cap in this aspect further comprises polyethylene or polyurethane material, the polyethylene or polyurethane material being pliable to allow for compression of the cap to form an effective seal to the mouths of bottles of varying diameter.

In yet another aspect, the invention is characterized as reusable bottle cap comprising: a stem portion about a vertical axis; and a flanged ring portion about an upper end of the stem portion, wherein the flanged ring portion further comprises a top portion and a lateral side, wherein the lateral side extends downward and outward from the top portion at a substantially constant negative slope, and wherein the top portion comprises a circular recess configured to receive a circular identification marker. The invention in this aspect is further characterized wherein the recess further comprises a lip around a rim thereof, and wherein the recess further comprises a plurality of cavities to receive a plurality of pins configured to the circular identification marker.

Additionally in this aspect, the stem further comprises a cylindrical base having a plurality of radial ridges protruding therefrom, wherein at an area where the ridges meet with the cylindrical base is devoid of a smooth and continuous transition. Also in this embodiment, the stem portion is hollow throughout its length from a top end to a bottom end, further except wherein a hollow stem is closed at the top end.

In still another aspect, the invention is characterized as a bottle cap cover to house and enclose a bottle cap stem portion, the bottle cap cover comprising: a crown at a top end thereof; a mid-portion; and a mouth having a lip wherein the lip comprises a groove, the groove configured to mate with complementary structure of the bottle cap, wherein the bottle cap cover is designed to keep the bottle cap free from dirt and debris when not in use.

The cover is further characterized wherein the mid-portion comprises a surface having a convex shape. Also, the cover further comprises an eyelet protruding from the crown, the eyelet designed to link to a key chain of a user. Alternatively, the eyelet protrudes from the mid-portion.

In yet still another aspect, the invention is a reusable bottle cap comprising: a stem portion about a vertical axis; and a flanged ring portion about an upper end of the stem portion, the flanged ring portion having an opening at a top end configured to receive an identification marker, the identification marker coupled to the flanged ring portion top end via a living hinge.

In a further aspect, the invention is a reusable bottle cap system comprising a bottle cap and a bottle cap cover. The bottle cap includes a proximal handling portion that extends in a radial direction from a central axis of the bottle cap and a stem that extends along central axis from the proximal handling portion to a distal end. The stem has an outside surface with sealing features for sealing to the mouth of a beverage bottle and an inside surface defining an opening extending to the distal end. The bottle cap cover includes a shell and a pin. The shell has an inside surface defining a cavity that is open on a proximal and closed at a distal end. The pin extends from the closed distal end of the inside surface of the shell and is received into the opening of the stem portion when the bottle cap cover is assembled to the bottle cap to provide a holding force to secure the bottle cap cover to the bottle cap.

The holding force provided by the pin engaging the opening can provide the primary holding force for securing the bottle cap cover to the bottle cap. Interference between the pin and the inside surface of the stem can provide static friction force that provides the holding force that secures the bottle cap cover to the bottle cap. The static friction force between the pin and the inside surface of the stem can be axial because the long central axis of the opening in the stem and the pin coincide with the central axis of the bottle cap system.

The cavity can completely enclose the stem. The shell can include an annular portion that engages the proximal handling portion to provide a mechanical seal that separates the cavity from an outside environment to thereby protect the stem from contamination. The proximal handling portion can include one of an annular groove and an annular flange for engaging the annular portion of the shell.

The sealing features can include a plurality of ridges that extend from an outside surface of the stem. The ridges can include a helical ridge with an extent along both the central axis and the radial direction. The ridges can include one or more disc-shaped ridges that each extend radially from the outside surface of the stem and each have a thickness defined along the central axis. The ridges can include a series of ridges with progressively decreasing radial extents along the central axis in a direction from the proximal handling portion toward the distal end of the stem.

The cavity can have an annular cavity that is defined between the pin and the inside surface of the shell. The annular cavity can contain at least a portion of the stem. Some of the sealing features or ridges can extend into the annular cavity.

The stem can extend the majority of the length of the cavity. The distal end of the stem can be proximate to a closed distal end of the shell surface. Each of the sealing features can be ridges that extend the majority of the radial extent of the cavity.

The bottle cap and the bottle cap cover are preferably formed from food grade polymer materials that are recyclable. The bottle cap can be formed from a relatively resilient compliant material such as a thermoplastic elastomer (TPE), thermoplastic rubber (TPR), silicone, or another material or combination of materials that facilitates a radial seal between the sealing features and the mouth of a bottle. The bottle cap cover can be formed from a relatively hard plastic material that is preferably more rigid and has a higher elastic modulus than the bottle cap. Examples of possible bottle cap materials include polypropylene (PP), polyamide (PA), acrylonitrile butadiene styrene (ABS), polycarbonate, and Polyethylene terephthalate (PET), to name a few examples. With the combination of a relatively compliant bottle cap and a relatively rigid bottle cap cover allows the annular portion of the shell to better seal to the annular surface of the proximal handling portion.

The invention can be better visualized by turning now to the following drawings wherein like elements are referenced by like numerals.

BRIEF DESCRIPTION OF THE FIGURES

The novel features of this invention, as well as the invention itself, both as to its structure and its operation, will be best understood from the accompanying drawings, taken in conjunction with the accompanying description, in which similar reference characters refer to similar parts, and in which:

FIG. 2A is a profile view of a second preferred bottle cap system of the present invention;

FIG. 2B illustrates a cross-sectional view taken along sectional line 2B-2B in FIG. 2A;

FIG. 2C illustrates an enlarged view of an area as identified in FIG. 2B;

FIG. 2D is a profile view of a first preferred bottle cap cover;

FIG. 6A through 6E illustrate how the present invention may be applicable to a variety of beverage (especially water) bottle designs;

FIG. 7C is a perspective view of the reusable bottle cap embodiment with an identification marker removed;

FIG. 7D is an additional perspective view of the reusable bottle cap from an underneath vantage point;

FIG. 7E is a perspective view of an additional bottle cap cover embodiment;

FIG. 8 is a sectional view of a variation of the embodiment illustrated in FIG. 2H;

DETAILED DESCRIPTION OF THE PREFERRED EMBODIMENTS

Figure 1A:
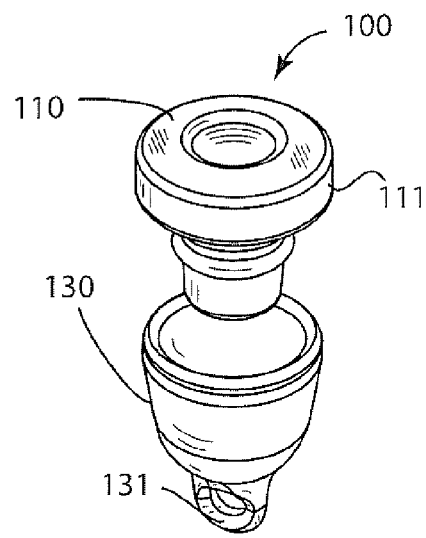
FIG. 1A is a perspective illustration of a first preferred embodiment of the present invention with a corresponding bottle cap cover.

With reference to FIG. 1A, a first preferred reusable bottle cap 110 system 100 of the present invention is illustrated in perspective. The upper portion of the drawing shows a reusable bottle cap 110 while the lower portion comprises a bottle cap 130 cover to protect the cap 100 from dirt and debris while not in use. The cap cover may further include an eyelet 131 for connecting to a key chain of a user as desired.

Figure 1B:
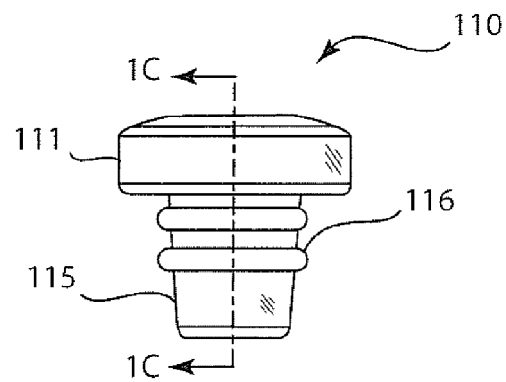
FIG. 1B is a profile view of the invention embodiment illustrated in FIG. 1A.
Figure 1C:
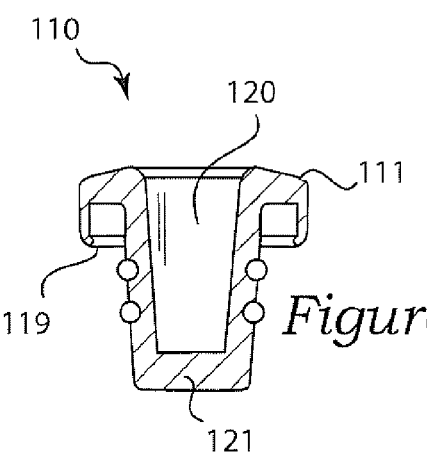
FIG. 1C illustrates a cross-sectional view taken along sectional line 1C-1C in FIG. 1B.

With regard to FIG. 1B and FIG. 1C, profile and sectional views of the first preferred bottle cap 110 are illustrated respectively. The cap 110 generally includes a stem portion 115 and a flanged ring portion 111 about an upper end of the stem portion 115. The stem 115 is configured to mate with an inner rim of a beverage (especially water) bottle opening, as shown in FIG. 5 and FIG. 6A through FIG. 6E. The stem portion 115 is additionally characterized in that it is hollow 120 through its length except that its bottom end is closed 121 (FIG. 1C). In this and in other embodiments, the stem further has a slight taper 218 (FIG. 2G) from top to bottom 121 to fit the inner rim of the mouth of beverage (especially water) bottles of varying inner diameters (FIGS. 5 and 6A through 6E). This particular stem embodiment 115 comprises two grooves machined around a circumference thereof; the grooves are additionally configured to receive two O-rings 116 wherein the O-rings assist in forming a seal in the top opening of a beverage (especially water) bottle (FIG. 6B).

Also referring to FIG. 1A through FIG. 1C, a flanged ring portion 111 of the bottle cap 110 generally extends outwardly from the upper stem and then extends downward to surround an upper rim of a bottle cap opening. A lateral side of the ring 111 extends slightly inward forming a lip 119. This lip 119 is configured to be received by the bottle cap cover 130, 230 similar to the embodiment shown in FIG. 2A through FIG. 2C. It is additionally contemplated herein that the bottle cap 110, 210, 310, 410, 510, 710, 810, 910 may be comprised of polyethylene or polyurethane material of sufficient pliability to allow for compression of the cap to form an effective (i.e., watertight) seal to the mouths of bottles of varying inner diameter. Also in a preferred embodiment, the bottle caps 110, 210, 310, 410, 510, 710, 810 and covers 130, 230, 430, 730 herein are comprised of biodegradable plastic and can be configured to soda bottles or beer bottles etc.

Referring to FIG. 2A through FIG. 2C, a second preferred reusable bottle cap system 200 is illustrated. This embodiment includes ridges 213 along a lateral side of the flanged ring portion 211. The ridges 213 may be useful to aid in grasping of the bottle cap 210 by a user. Further, the stem portion comprises successive U-shaped grooves 216, 217 along its length; the U-shaped grooves being directly adjacent to one another forming a crest 216 and a trough 217; the crest 216 between two adjacent troughs 217 forming a point 216.

Further to FIG. 2A and FIG. 2B the bottle cap 210 is illustrated coupled to a bottle cap cover 230 for storage of the bottle cap when not in use. The cover 230 may optionally include an eyelet 231 so that the cover 230 and bottle cap 210 together may be conveniently carried on a key chain. The cover 230 is generally bell shaped, but could also be conical in shape, or barrel shaped 430, 730.

Figure 2E:
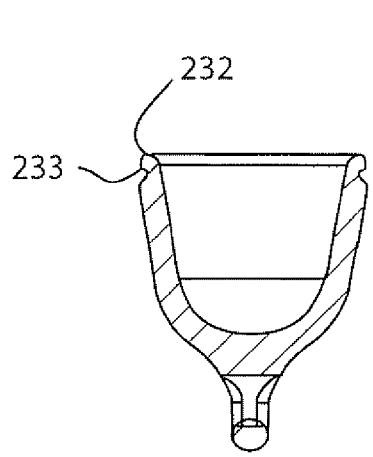
FIG. 2E illustrates a cross-sectional view of the bottle cap cover of present invention taken along sectional line 2E-2E in FIG. 2D.
Figure 2F:
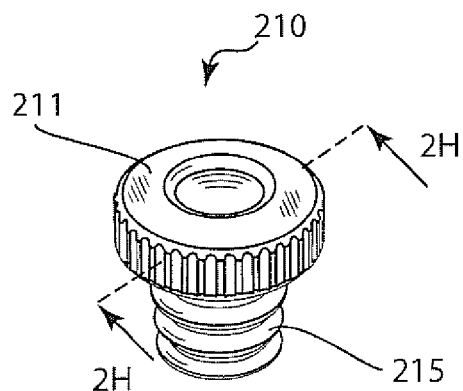
FIG. 2F is a perspective view of the second preferred bottle cap embodiment illustrated of the present invention.
Figure 2G:
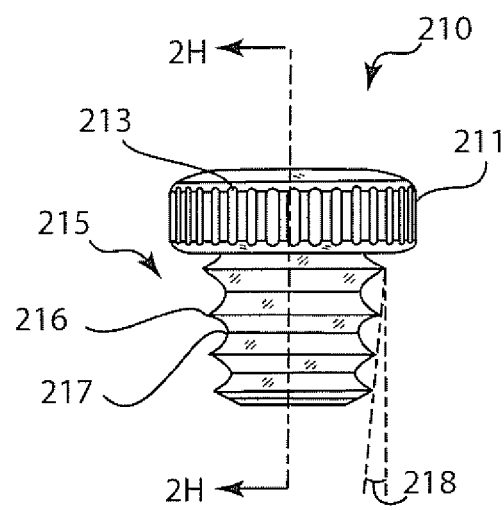
FIG. 2G illustrates a profile view of the second preferred reusable bottle cap.

With regard to FIG. 2C, an enlarged view of a lip portion 219 of the bottle cap ring mating with a groove 233 of a rim 232 of the bottle cap cover is illustrated (FIG. 2D and FIG. 2E). As stated, the lip portion 219 extends inward slightly to form a complementary union with the rim 232 and groove 233 encircling the outer circumference of the open end of the cover 230. The mating is sized and configured such that the two pieces 210, 230 can snap together with a minimal amount of force. It is further contemplated herein that a bottle cap 210 and cover 230 comprised of different colors would serve a purpose of identification.

Figure 2H:
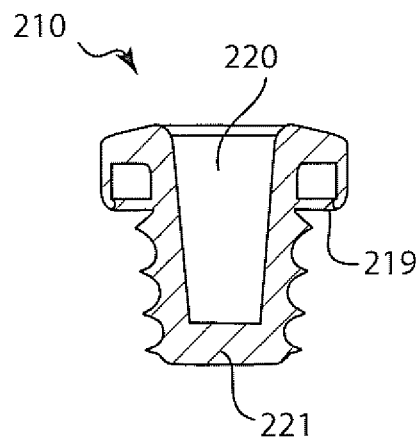
FIG. 2H illustrates a cross-sectional view taken along sectional line 2H-2H in FIG. 2F and again in FIG. 2G.

Referring to FIG. 2H, the bottle cap 210 herein may have a hollow 220 stem 215, however closed 221 at a bottom end. Alternatively with reference to FIG. 8, the bottle cap 810 hollow 820 stem may be closed 822 at a top end.

Figure 3A:
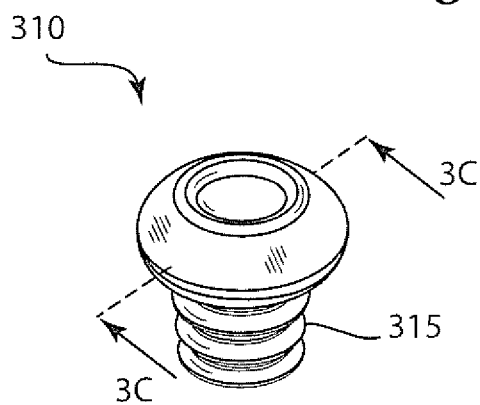
FIG. 3A is a perspective illustration of a third preferred reusable bottle cap of the present invention.
Figure 3B:
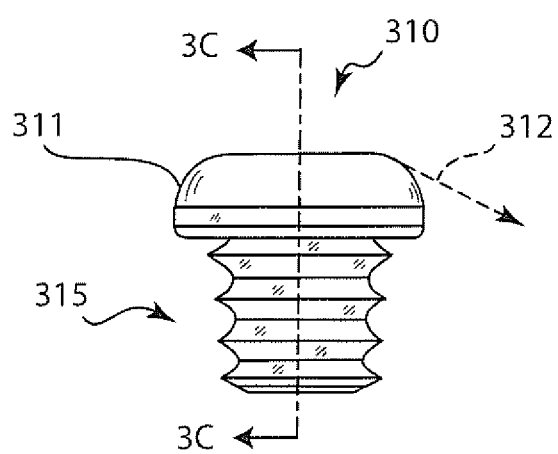
FIG. 3B is a profile view of the invention embodiment illustrated in FIG. 3A.
Figure 3C:
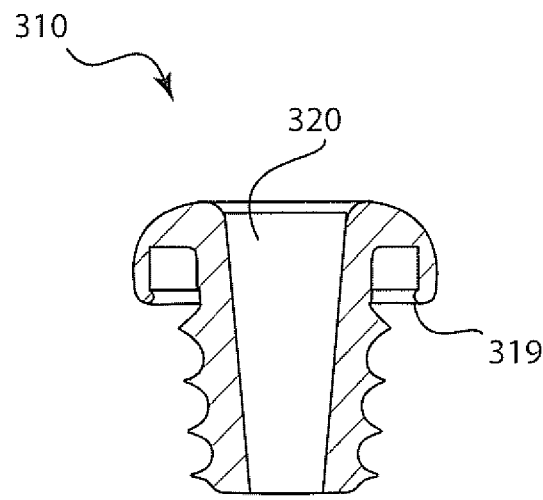
FIG. 3C illustrates a cross-sectional view taken along sectional line 3C-3C in FIG. 3A and again in FIG. 3B.

FIG. 3A illustrates a perspective view of a third preferred bottle cap 310 embodiment of the present invention; FIG. 3B is a profile view of the third preferred embodiment 310; and FIG. 3C illustrates a cross-sectional view taken along sectional line 3C-3C. In this embodiment, the flanged ring portion 311 has an outside surface that extends outwardly and downward smoothly and continuously to form a rounded ring from lateral side to a top surface. Stated differently, the flanged ring portion 311 has a surface having a slope 312, the slope is continuously increasing and negative from a top to a lateral side without a step change in slope 312. Further, the flanged ring portion 311 is configured to fit around mouths of bottles of varying outer diameter. Additionally, the stem 315 is hollow 320 throughout its vertical axis through which a user may dispense of the contents or so that a straw would be permitted to fit through the stem 315.

Figure 4:
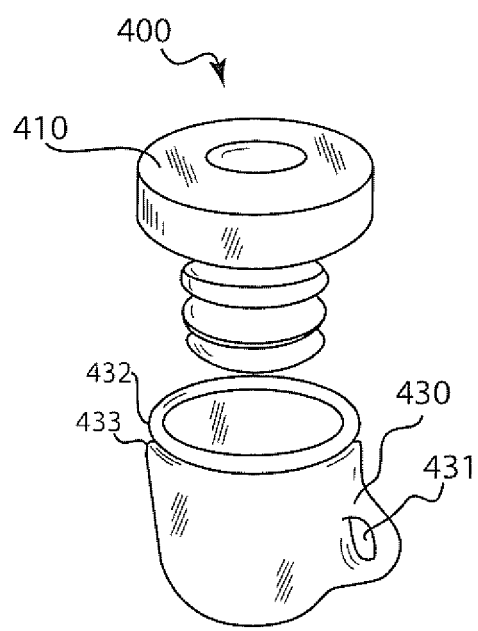
FIG. 4 is a perspective illustration of another preferred bottle cap system of the present invention.

FIG. 4 illustrates yet another reusable bottle cap system 400 comprising bottle cap 410 and cover 430. It should be readily appreciated that many cap embodiments 110, 210, 310, 410, 510, 710, 810, 910 could be coupled to different cover embodiments 130, 230, 430. FIG. 4 is further illustrative of a bottle cap cover 430 having an eyelet 431 on a side thereof. In this configuration, the cover 430 is generally in the shape of a tea cup having a flat bottom end continuously curving to an open upper end comprising a rim 432 and groove 433.

Figure 5:
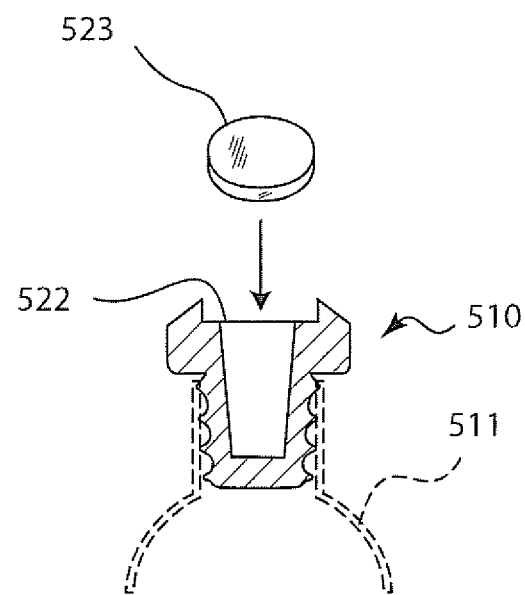
FIG. 5 is schematical illustration of another preferred embodiment employing a marker as identification means.

With regard to FIG. 5, a schematic illustration of yet another invention embodiment is shown. In this variation, the bottle cap top comprises a circular recess 522 to receive a color coded or labeled marker 523. This labeling may further comprise one or more of the following: an individual's name/initials/monogram; a company name/moniker/emblem and/or contact information and/or website and/or social networking page (e.g. MySpace, Facebook, Twitter, etc.) and/or logo; any or all of the same information for a sports team, a musical artist/band, or a fictional/real character. The recess 522 is sized such that the marker 523 will fit snuggly thereto. Further, a relief may be provided to the recess 522 to assist a user in removing the marker 523.

With reference to FIG. 6A to FIG. 6E, a manner in which the bottle cap 110, 210, 310, 410, 510, 710, 810, 910 can mate to the inside of the opening of a beverage (especially water) bottle is illustrated with various examples. Since the bottle cap contains a slight taper 218, it a can mate with a variety of water bottles available at retail having a slightly different size opening. Also, the invention will fit a water bottle regardless of the thread configuration on the outer part of the opening.

Figure 7A:
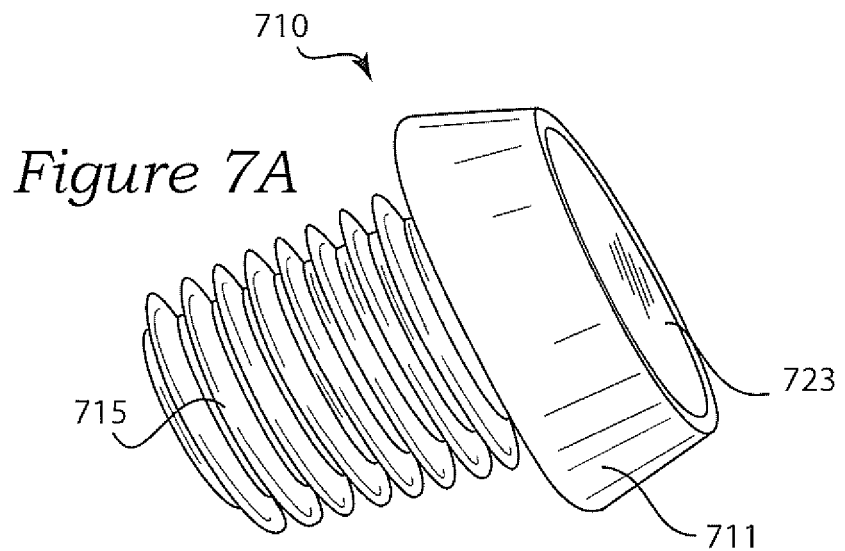
FIG. 7A illustrates a perspective view of an additional bottle cap embodiment from an above vantage point.
Figure 7B:
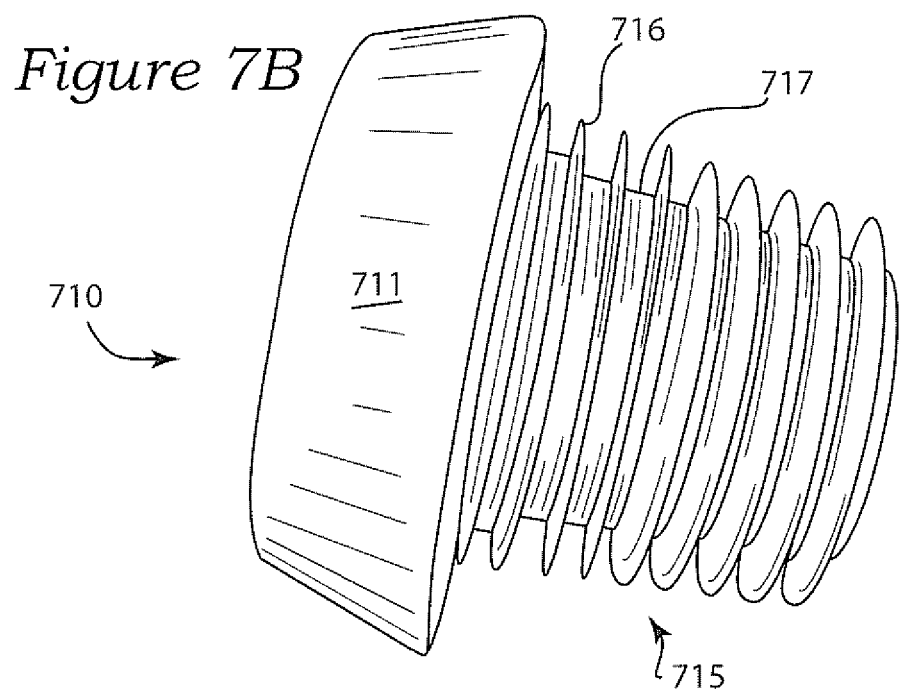
FIG. 7B illustrates a perspective view of the bottle cap embodiment from a side vantage point.

Now turning to FIG. 7A through FIG. 7E, another preferred embodiment of the present invention is illustrated and generally comprises reusable bottle cap 710 with a cover 730 thereto. FIG. 7A more specifically illustrates an identification marker 723 coupled to a flanged ring portion 711. Close inspection of FIG. 7A and FIG. 7B revels that the stem portion 715 comprises different structure than in previous embodiment. More particularly, the stem 715 has a cylindrical base 717 and therefore the surface between adjacent peaks 716 is substantially flat. The peaks 716 themselves are additionally different than previous embodiment in that they protrude outward with a slight convex surface; whereas the previous embodiment 215 comprises a concave surface 217 to a peak 216 also comprising a point 216, 716. Additionally, since the peaks 716 comprise a surface that is slightly convex, then also the peaks 716 are not flat or thin like a wafer.

With reference to FIG. 7C, a perspective view of the reusable bottle cap embodiment with an identification marker 723 removed is shown. Identification marker 723 is configured to be received by a recess 722 carved out of the flanged ring portion 711. More specifically, the marker 723 comprises a plurality of pins 725 configured to be received by a respective plurality of cavities 724. With regard to FIG. 7D, the flanged ring portion 711 and stem 715 are hollow 720 so that into which a straw could fit if the marker 723 was removed. As with other embodiments, the underside of the flanged ring portion 711 has a lip 719 configured to connect to a lip 732 and groove 733 of a bottle cap cover 730 (FIG. 7E). In this embodiment 730, the bottle cap cover 730 is barrel shaped and not bell shaped 230 or cone shaped. The barrel shape 730 in this modification will result in more usable surface area to affix a logo or a design thereto. The embodiment similarly comprises an eyelet 731. It is still further contemplated that marker 523, 723 and/or bottle cap 110, 210, 310, 410, 510, 710, 810, 910 may comprise cold-activated material, in which a temperature change will cause a chemical within the material to change color, further providing identification means of own bottle (FIG. 6A through FIG. 6E).

Figure 9:
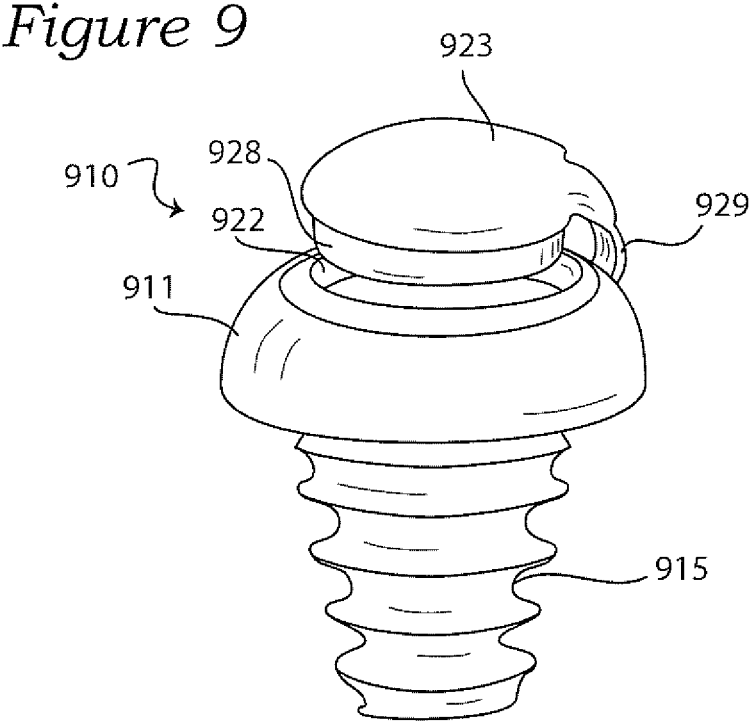
FIG. 9 is a perspective view of a living hinge embodiment applicable to an identification marker.

With regard to FIG. 9, an alternative embodiment that has an identification marker 923 coupled to a bottle cap 910 with a living hinge 929. The living hinge comprises a thin, narrow plastic material that is able to pivot, forming a hinge. Stem 915 is illustrated as an example and could be replaced with other stem designs of the present invention. It is further contemplated that identification marker 923 could act as a lid to the bottle cap 910, so that the cap 910 itself would not have to be removed to expel bottle contents. Marker 923 further comprises a vertical surface 928 to mate with a vertical surface 922 on flanged ring portion 911.

Figure 10:
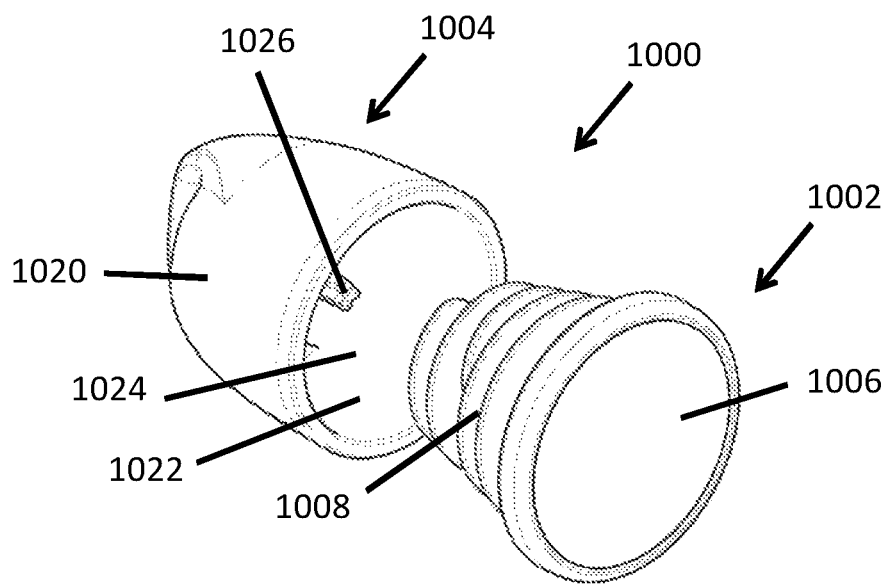
FIG. 10 is a first isometric view of a yet another bottle cap system embodiment that utilizes a pin to secure a bottle cap cover to a bottle cap.
Figure 11:
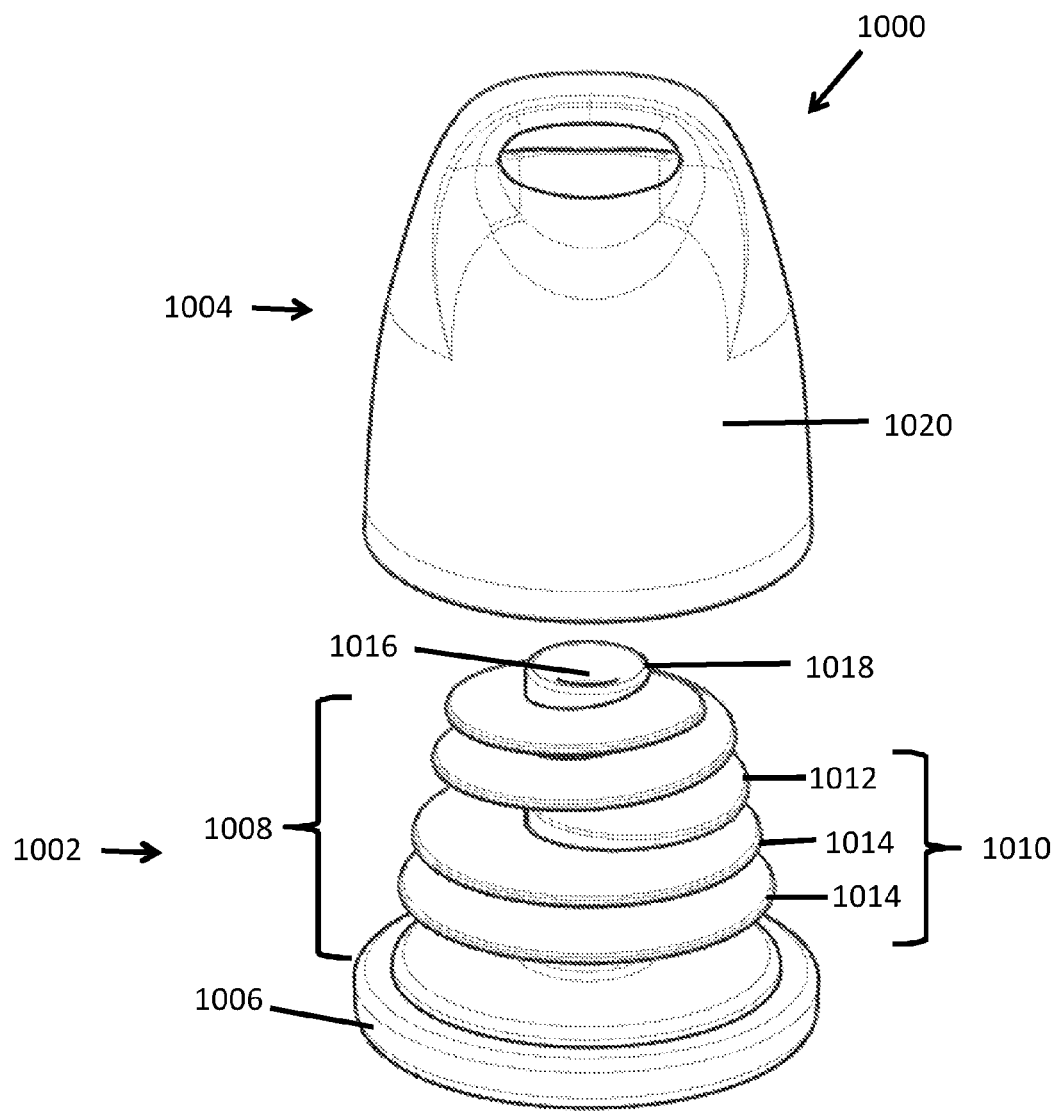
FIG. 11 is second isometric view of the bottle cap system of FIG. 10.

FIGS. 10-14 (including 14A and 14B) depict another alternative embodiment of a reusable bottle cap system 1000 of the present invention. FIGS. 10 and 11 are isometric views of reusable bottle cap system 1000 including a bottle cap 1002 and bottle cap cover 1004. Bottle cap 1002 includes a proximal handling portion 1006 and stem 1008.

A user can grasp proximal handling portion 1006 while sealing the mouth of a bottle with stem 1008.

Stem 1008 includes a plurality of ridges 1010 that engage the mouth of a bottle to allow bottle cap 1002 to provide a fluid seal of the bottle. In the embodiment shown, the ridges 1010 include a spiral or helical ridge 1012 and two disc-shaped ridges 1014. Stem 1008 also has an opening 1016 formed into a distal end 1018 of stem 1008.

When the bottle cap 1002 is in use the stem 1008 is sealing the mouth of a bottle. When bottle cap 1002 is not in use, bottle cap cover 1004 is assembled to bottle cap 1002 in order to protect stem 1008 from contamination. Bottle cap cover 1004 has an outside surface 1020 and an opposing inside surface 1022. Inside surface 1022 defines a cavity 1024 for receiving and containing stem 1008 when bottle cap cover 1004 is assembled to bottle cap 1002.

Figure 14A:
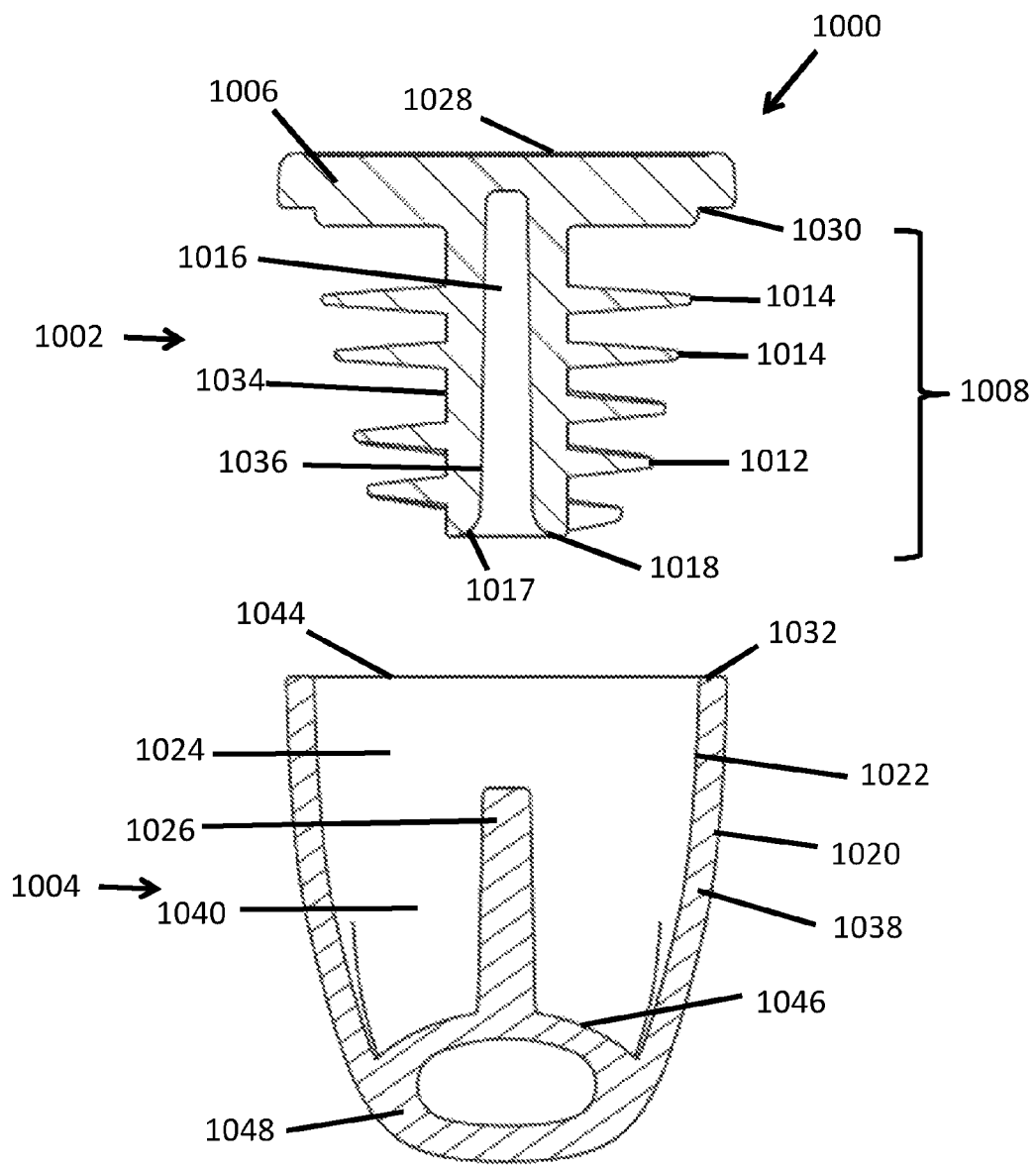
FIG. 14A is a cross sectional view taken from section AA' of FIG. 13 for a bottle cap system in an unassembled state.
Figure 14B:
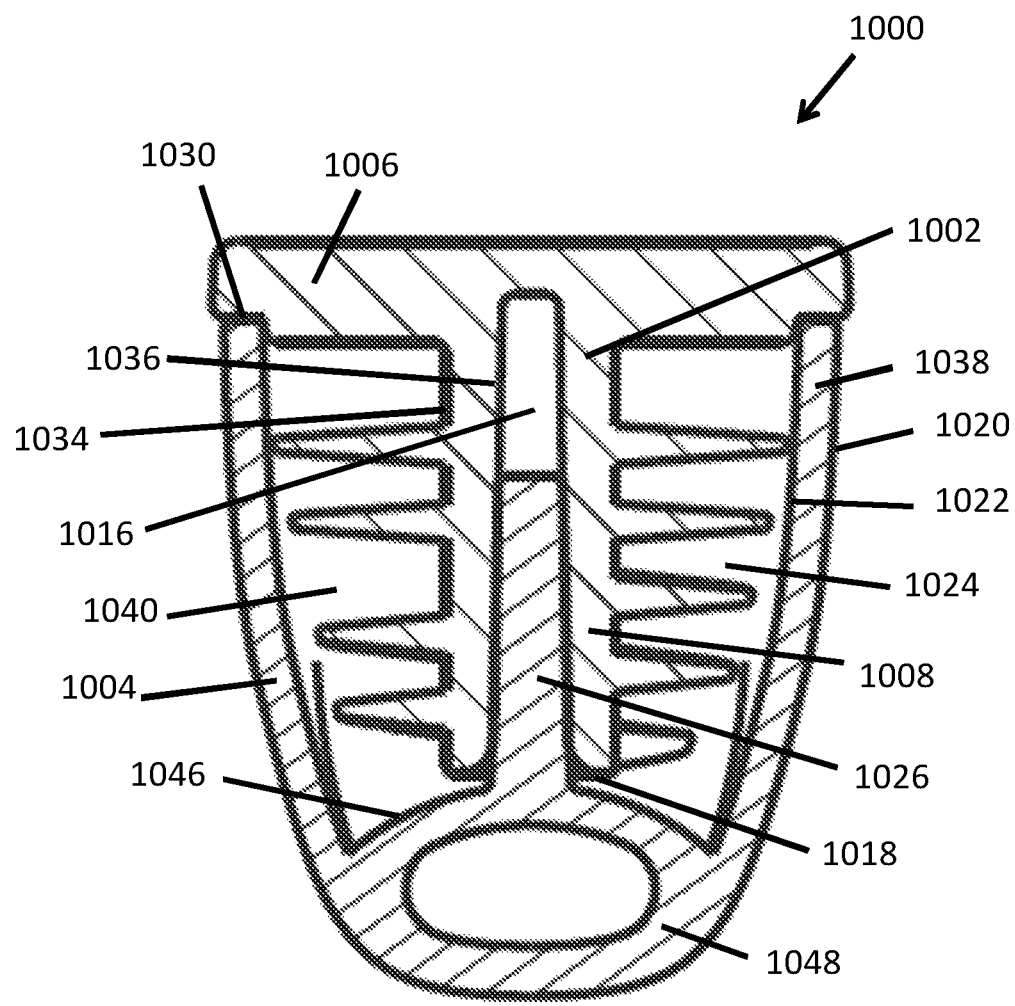
FIG. 14B is a cross sectional view taken from section AA' of FIG. 13 for a bottle cap system in an assembled state.

Bottle cap cover 1004 also has a pin 1026 that extends from a closed distal end of inside surface 1022. When bottle cap cover 1004 is assembled to bottle cap 1002, pin 1026 is received into opening 1016. There is an interference fit between pin 1026 and opening 1016 that provides a mechanical coupling between bottle cap cover 1004 and bottle cap 1002. This provides a holding force based on static friction between the pin 1026 and the inside surface 1036 of stem 1008 (FIGS. 14A, 14B). This axial static friction holding force provides the primary or perhaps even the entire mechanical support that secures bottle cap cover 1004 to bottle cap 1002.

Figure 12:
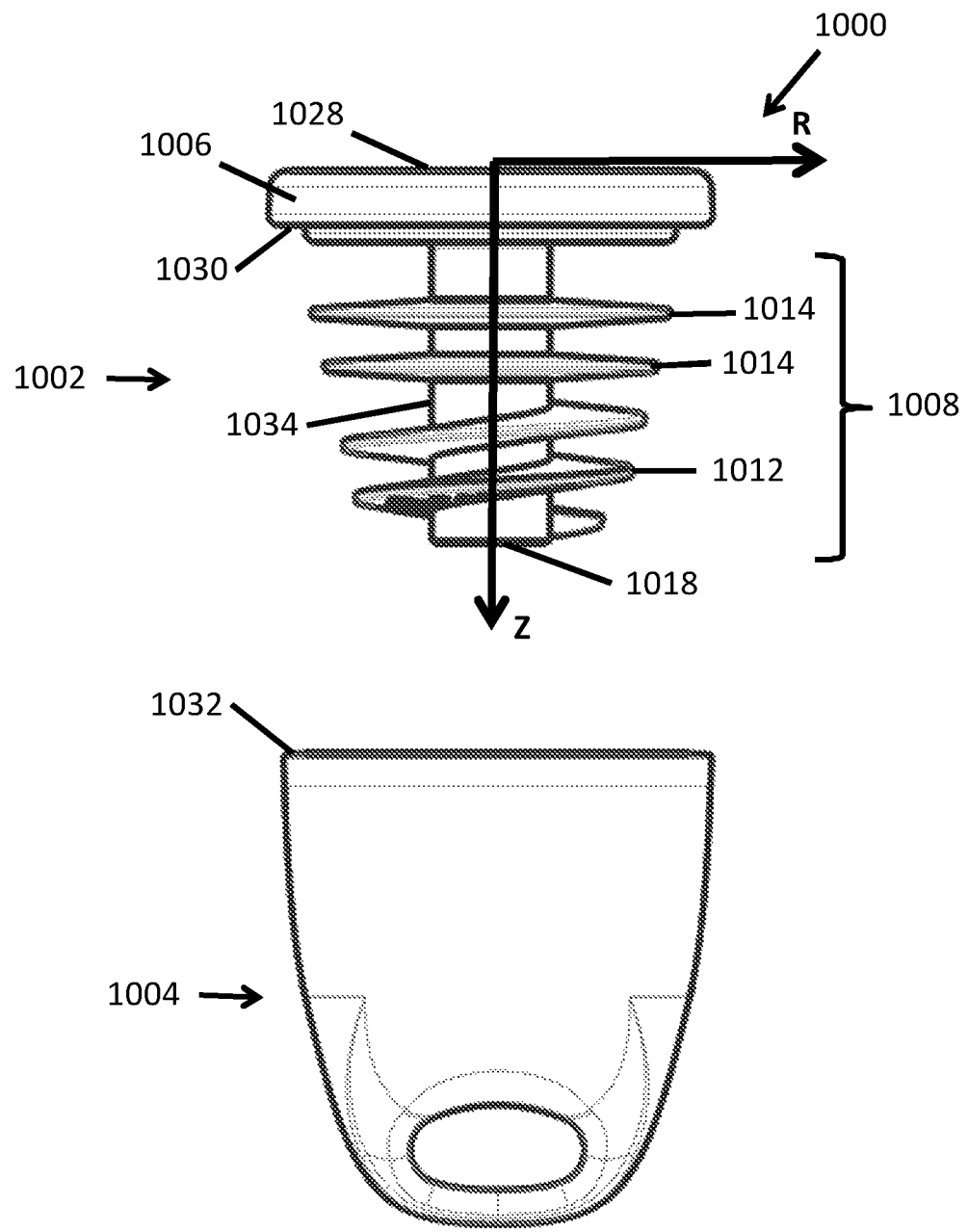
FIG. 12 is a side view of the bottle cap system of FIG. 10.

FIG. 12 is a side view of bottle cap system 1000 including bottle cap 1002 and bottle cap cover 1004. FIG. 12 depicts cylindrical axes Z and R that are used to facilitate description of bottle cap system 1000. Central axis Z extends from a proximal end toward a distal end in the +Z direction. Radial axis R is perpendicular to the central axis Z. A "proximal direction" is generally in the −Z direction and a "distal direction" is generally in the +Z direction for describing bottle cap system 1000.

Proximal handing portion 1006 is generally disc-shaped and extends radially from central axis Z along radial axis R. Proximal handling portion 1006 has a proximal end surface 1028 that defines the proximal end of bottle cap 1002. Proximal handling portion 1006 also has an annular surface or groove 1030 that at least partially faces in the distal direction +Z. Annular groove 1030 receives an annular surface portion 1032 of bottle cap cover 1004 when bottle cap cover 1004 is assembled to bottle cap 1002. In the illustrated embodiment, the engagement of the annular groove 1030 and the annular portion 1032 of the bottle cap cover does not provide a substantial holding force between bottle cap cover 1004 and bottle cap 1002. The holding force that maintains assembly between bottle cap cover 1004 and bottle cap 1002 is essentially entirely provided by the interference fit between pin 1026 and opening 1016. However, the engagement of the annular groove 1030 and the annular portion 1032 does close off the cavity 1024 containing stem 1008 from an outside environment to thereby protect stem 1008 from contamination.

Stem 1008 extends in the distal +Z direction along the central axis Z from the proximal handling portion 1006. The stem 1008 has an outer surface 1034 from which the plurality of ridges 1010 (FIG. 11) extend. The helical ridge 1012 extends from outer surface 1034 along both the axial Z (along central axis Z) and radial R directions (FIGS. 11, 12). Each of the disc-shaped ridges 1014 extend along the radial R direction while their thicknesses are defined along the axial Z direction. The radial extent of the ridges 1010 decreases in the distal (+Z) direction.

Figure 13:
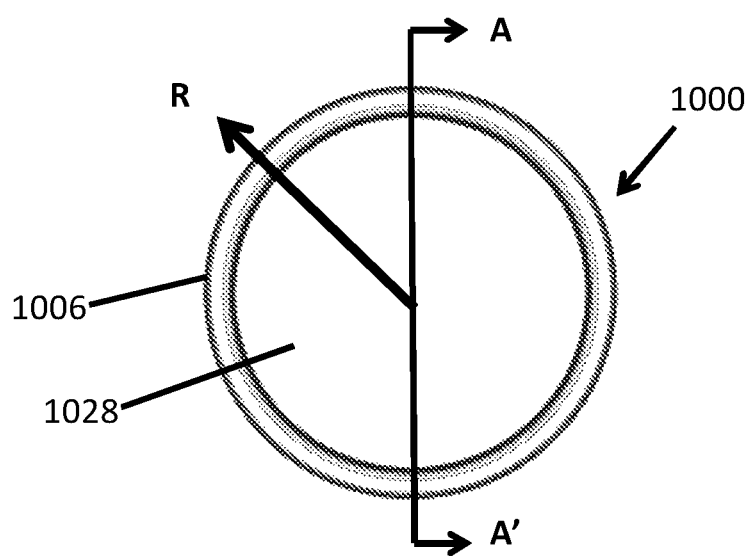
FIG. 13 is a top view of the bottle cap system of FIG. 10.

FIG. 13 is a "top" view of the bottle cap system 1000 "looking" in the distal +Z direction along the central axis Z. The radial direction R is indicated. From this perspective only the proximal handling portion 1006 is in view. Proximal end surface 1028 is visible from this view.

FIG. 14A is a cross sectional view of bottle cap system 1000 taken from section lines AA' of FIG. 13 in the unassembled state. Stem 1008 has opposing outside 1034 and inside 1036 surfaces. The inside surface 1036 of stem 1008 defines axial opening 1016 that extends along the central axis Z from the distal end 1018 of the stem 1008. Axial opening 1016 has its major axis defined along the central axis Z and two equal minor axes defined along the radial R axis. The axial opening 1016 has a small draft angle or taper whereby the minor axes decrease in the proximal (−Z) direction away from the distal end 1018 of the bottle cap 1002. Axial opening 1016 also has a curved entrance 1017 that facilities engagement and alignment between pin 1026 and axial opening 1016.

Bottle cap cover 1004 includes a shell 1038 having outside surface 1020 and opposing inside surface 1022. The inside surface 1022 of bottle cap cover 1004 defines cavity 1024 for containing stem 1008 when the bottle cap system 1000 is assembled. A portion of cavity 1024 is an annular cavity portion 1040 that is defined between pin 1026 and inside surface 1022. At least a portion of stem 1008 resides within annular cavity 1040 when bottle cap system 1000 is assembled.

The inside surface 1022 defines an opening at a proximal end 1044 and has a closed distal end 1046. The cavity 1024 (and annular cavity 1040) is closed at the distal end 1046 of inside surface 1022. The pin 1026 extends along the central axis Z from the distal end 1046 in the proximal −Z direction. The bottle cap cover 1004 also includes an eyelet loop 1048 that defines the extreme distal end 1048 of bottle cap cover 1004.

FIG. 14B is a cross sectional view of bottle cap system 1000 taken from section lines AA' of FIG. 13 in the assembled state. According to this embodiment, pin 1026 has been received into the stem opening 1016. The bottle cap cover 1004 is affixed to bottle cap 1002 due to a mechanical interaction between pin 1026 and the inside surface 1036 of stem 1008. The mechanical interaction is the interference fit of pin 1026 against inside surface 1036 of stem 1008. According to the embodiment depicted in FIGS. 10-14, the interference fit between pin 1026 and inside surface 1036 provides the primary support that maintains the assembled state of bottle cap system 1000. The interference fit is radial interference (along R) that provides an axial (along central axis Z) static friction holding force. In an exemplary embodiment the interference fit provides essentially all of the mechanical assembly support.

In the assembled state at least a portion of stem 1008 resides in the annular cavity 1040. At least some of the plurality of ridges 1010 (FIG. 11) extend into the annular cavity 1040. The cavity 1024 including the annular cavity 1040 is sealed from environmental contamination along annular groove 1030 (FIG. 14A). The seal is formed by an engagement between an annular surface 1032 of shell 1038 and the annular groove 1030. The seal may or may not be air tight but is sufficient to protect cavity 1024 and stem 1008 from dust and other contamination from the environment.

In the assembled state stem 1008 extends the majority of the length of cavity 1024. Stem 1008 extends from proximal handling portion 1006 to distal end 1018. The distal end 1018 extends substantially to the closed distal end 1046 of surface 1022. Each of the ridges 1010 (FIG. 11) extend the majority of the radial extent of the cavity 1024.

The bottle cap 1002 and the bottle cap cover 1004 are preferably formed from food grade polymer materials that are recyclable. The bottle cap 1002 can be formed from a relatively resilient compliant material such as a thermoplastic elastomer (TPE), thermoplastic rubber (TPR), silicone, or another material or combination of materials that facilitates a radial seal between the sealing features and the mouth of a bottle. The bottle cap cover 1004 can be formed from a relatively hard plastic material that is preferably more rigid and has a higher elastic modulus than the bottle cap 1002. Examples of possible bottle cap cover 1004 materials include polypropylene (PP), polyamide (PA), acrylonitrile butadiene styrene (ABS), polycarbonate, and Polyethylene terephthalate (PET), to name a few examples. The combination of a relatively compliant bottle cap 1002 and a relatively rigid bottle cap cover 1004 allows the annular portion 1032 (FIG. 14A) of the shell 1038 to better seal to the annular surface 1030 of the proximal handling portion 1006.

Figure 15:
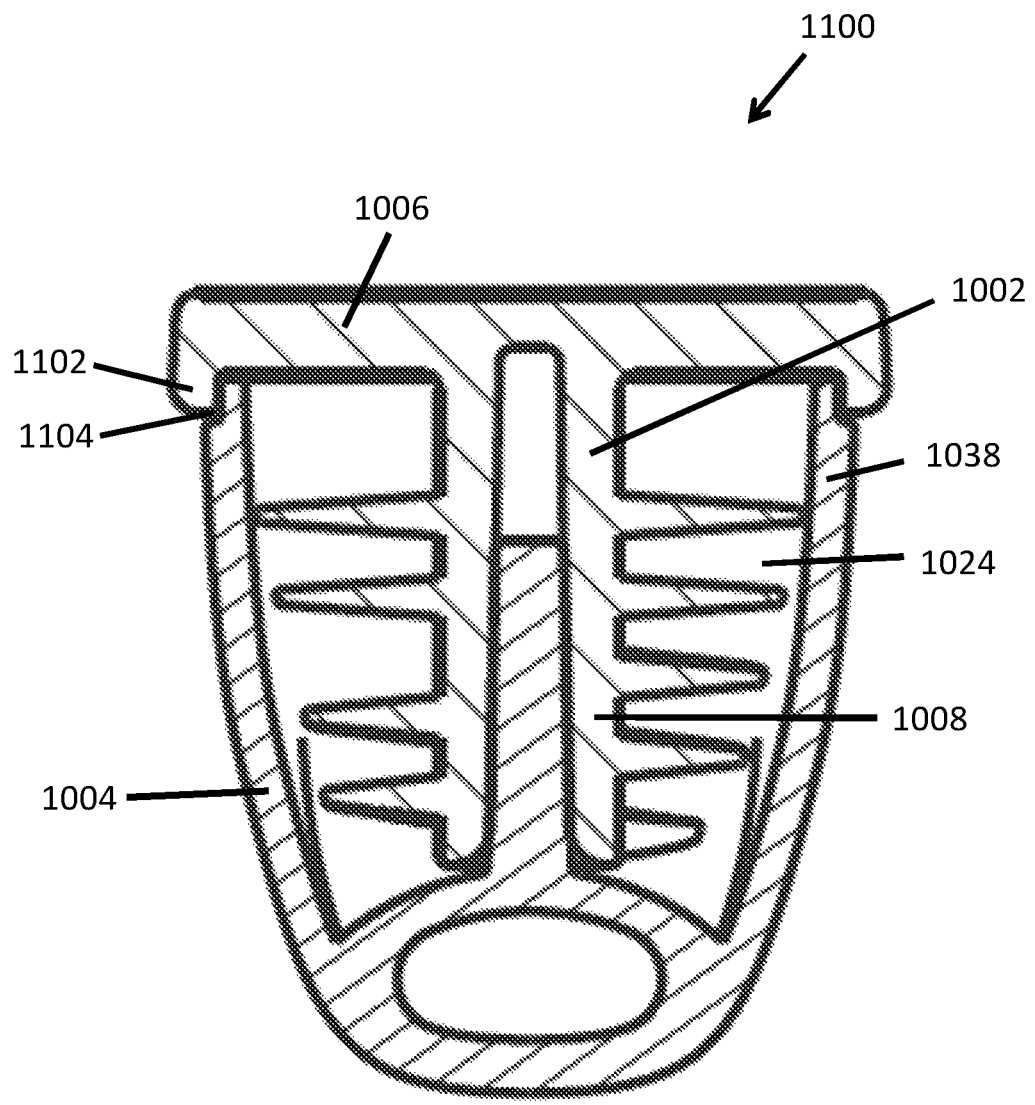
FIG. 15 is a cross sectional view taken from AA' of FIG. 13 for yet another bottle cap system embodiment.

FIG. 15 depicts another alternative embodiment of a reusable bottle cap system 1100. FIG. 15 is a cross sectional view that is the same as that of FIG. 14B except for a design difference to be discussed. Like reference numerals reflect like elements except as discussed. In the embodiment shown in FIG. 15, the proximal handling portion 1006 of bottle cap 1002 includes an annular flange 1102 that extends in a distal +Z direction from proximal handling portion 1006. Shell 1038 has an annular groove 1104 formed therein. The annular flange 1102 and the annular groove 1104 form an interference fit that provide two functions: (1) an interference-based mechanical support for coupling the bottle cap cover 1004 to the bottle cap 1002 and (2) a seal for separating cavity 1024 from an outside atmosphere to prevent contamination of stem 1008.

Figure 16:
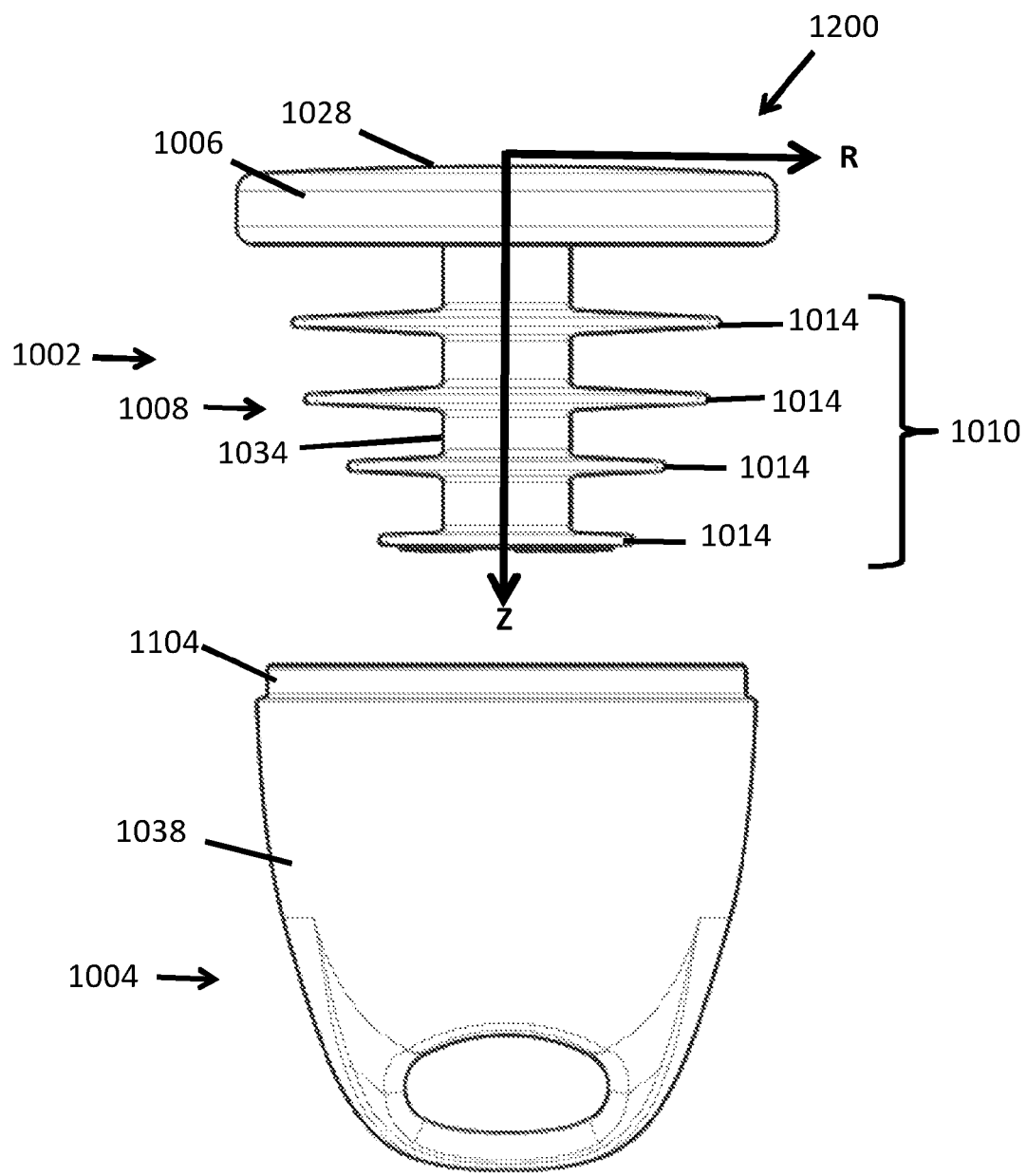
FIG. 16 is a side view of a yet further embodiment of a bottle cap system.

FIG. 16 depicts yet another alternative embodiment of a reusable bottle cap system 1200. FIG. 16 is similar to FIG. 12 except for two differences in the depicted design. The first difference is that all of the plurality of ridges 1010 are disc-shaped ridges 1014. The depicted ridges include four successive disc-shaped ridges 1014. The ridges 1010 have a progressively decreasing radial extent in a distal +Z direction from the proximal handing portion 1006. Another difference from FIG. 12 is that the shell 1038 has an annular groove 1104 for engaging an annular flange 1102 (FIG. 15) that extends from the proximal handling portion 1006. Otherwise the design depicted in FIG. 16 is similar to the design depicted in FIG. 12.

Yet other embodiments are possible. For example, another embodiment not shown would be the same as that depicted in FIG. 10-14 except for the use of four disc-shaped ridges 1014 as depicted in FIG. 16. Yet other designs may include fewer or more ridges 1010 which can be either helical ridges 1012 or disc-shaped ridges 1014.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular Reusable Bottle Cap Having Identification Means as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. A reusable bottle cap system comprising:
   a bottle cap including:
      a proximal handling portion that extends in a radial direction from a central axis of the bottle cap; and
      a stem that extends along the central axis from the proximal handling portion to a distal end, the stem has an outside surface with a sealing feature for sealing to the mouth of a beverage bottle and an inside surface defining an opening extending to the distal end; and
   a bottle cap cover including:
      a shell having an inside surface defining a cavity that is open on a proximal end and closed at a distal end; and
      a pin that extends from the closed distal end of the inside surface of the shell, the pin is received into the opening of the stem portion when the bottle cap cover is assembled to the bottle cap to provide a holding force to secure the bottle cap cover to the bottle cap, the cavity encloses the stem and the shell includes an annular portion that engages the proximal handling portion to provide a mechanical seal that separates the cavity from an outside environment to thereby protect the stem from contamination, the proximal handling portion includes one of an annular groove and an annular flange for engaging the annular portion of the shell.

2. The reusable bottle cap system of claim 1 wherein an annular cavity is defined between the pin and the inside surface of the shell and wherein at least a portion of the stem is disposed within the annular cavity.

3. The reusable bottle cap system of claim 2 wherein at least one ridge extends into the annular cavity.

4. A reusable bottle cap system comprising:
   a bottle cap including:
   a proximal handling portion that extends in a radial direction from a central axis of the bottle cap; and
   a stem that extends along the central axis from the proximal handling portion to a distal end, the stem has an outside surface with a sealing feature for sealing to the mouth of a beverage bottle and an inside surface defining an opening extending to the distal end; and
   a bottle cap cover including:
   a shell having an inside surface defining a cavity that is open on a proximal end and closed at a distal end; and
   a pin that extends from the closed distal end of the inside surface of the shell, the pin is received into the opening of the stem portion when the bottle cap cover is assembled to the bottle cap to provide a holding force to secure the bottle cap cover to the bottle cap, the holding force provided by the pin engaging the opening provides the primary holding force for securing the bottle cap cover to the bottle cap.

5. The reusable bottle cap system of claim 4 wherein the sealing feature includes a plurality of ridges that extend from the outside surface of the stem.

6. The reusable bottle cap system of claim 5 wherein the ridges include at least one disk-shaped ridge that extends radially from the outside surface of the stem and has a thickness along the central axis.

7. The reusable bottle cap system of claim 5 wherein the ridges includes a series of ridges with progressively decreasing radial extents along the central axis in a direction from the proximal handling portion toward the distal end of the stem.

8. A reusable bottle cap system comprising:
a bottle cap including:
   a proximal handling portion that extends in a radial direction from a central axis of the bottle cap; and
   a stem that extends along the central axis from the proximal handling portion to a distal end, the stem has an outside surface with a sealing feature for sealing to the mouth of a beverage bottle and an inside surface defining an opening extending to the distal end; and
a bottle cap cover including:
   a shell having an inside surface defining a cavity that is open on a proximal end and closed at a distal end; and
   a pin that extends from the closed distal end of the inside surface of the shell, the pin is received into the opening of the stem portion when the bottle cap cover is assembled to the bottle cap to provide a holding force to secure the bottle cap cover to the bottle cap, the sealing feature includes a plurality of ridges that extend from the outside surface of the stem, the ridges include a helical ridge with an extent along both the central axis and the radial direction.

9. A reusable bottle cap system comprising:
a bottle cap including:
   a proximal handling portion that extends in a radial direction from a central axis of the bottle cap and having an annular sealing surface;
   a stem that extends along the central axis from the proximal handling portion to a distal end, the stem portion having opposing outside and inside surfaces, the outside surface having a plurality of ridges for sealing to mouths of a beverage bottles, the inside surface defining an axial opening that extends to the distal end of the stem;
a bottle cap cover comprising:
   a shell defining a cavity for enclosing the stem portion and having a complementary annular surface for engaging the annular sealing surface of the proximal handling portion to close the cavity from an outside environment to thereby protect the stem portion from contamination; and
   a pin extending from the shell portion that is received into the axial opening when the bottle cap cover is assembled to the bottle cap whereby interference between the pin and the inside surface of the bottle cap provides an axial static friction force that holds the bottle cap cover onto the bottle cap, the axial static friction force is a primary means of securing the bottle cap cover to the bottle cap.

10. The bottle cap system of claim 9 wherein the plurality of ridges include a plurality of disc-shaped ridges that each extend radially from the outside surface of the stem and have a thickness along the central axis.

11. The bottle cap system of claim 9 wherein the cavity includes an annular cavity portion defined between the pin and the shell.

12. A reusable bottle cap system comprising:
a bottle cap including:
   a proximal handling portion that extends in a radial direction from a central axis of the bottle cap and having an annular sealing surface;
   a stem that extends along the central axis from the proximal handling portion to a distal end, the stem portion having opposing outside and inside surfaces, the outside surface having a plurality of ridges for sealing to mouths of a beverage bottles, the inside surface defining an axial opening that extends to the distal end of the stem;
a bottle cap cover comprising:
   a shell defining a cavity for enclosing the stem portion and having a complementary annular surface for engaging the annular sealing surface of the proximal handling portion to close the cavity from an outside environment to thereby protect the stem portion from contamination; and
   a pin extending from the shell portion that is received into the axial opening when the bottle cap cover is assembled to the bottle cap whereby interference between the pin and the inside surface of the bottle cap provides an axial static friction force that holds the bottle cap cover onto the bottle cap, the plurality of ridges includes a helical ridge that extends both radially and axially relative to the outside surface of the stem.

13. A reusable bottle cap system comprising:
a bottle cap including:
   a proximal handling portion that extends in a radial direction from a central axis of the bottle cap and having an annular sealing surface;
   a stem that extends along the central axis from the proximal handling portion to a distal end, the stem portion having opposing outside and inside surfaces, the outside surface having a plurality of ridges for sealing to the mouth of a beverage bottle;
a bottle cap cover comprising:
   a shell defining a cavity for enclosing the stem portion and having a complementary annular surface for engaging the annular sealing surface of the proximal handling portion to close the cavity from an outside environment to thereby protect the stem portion from contamination the shell open at a proximal end and closed at a distal end; and
axial friction means including a pin and an axial opening that engage along the central axis proximate to the distal end of the stem and the distal end of the shell whereby assembly of the bottle cap cover to the bottle cap causes the pin to be received into the axial opening and to provide an axial frictional holding force that opposes removal of the bottle cap cover from the bottle cap along the central axis.

14. The reusable bottle cap system of claim 13 wherein the pin extends from the shell and the axial opening is defined in the stem.

* * * * *